Feb. 4, 1941.　　　C. E. SHUMAKER　　　2,230,439
AUTOMOBILE BODY STRUCTURE
Filed March 10, 1939　　　2 Sheets-Sheet 1
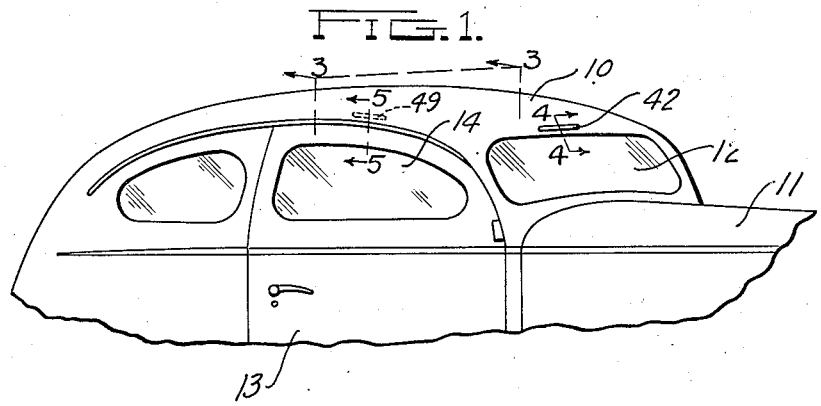
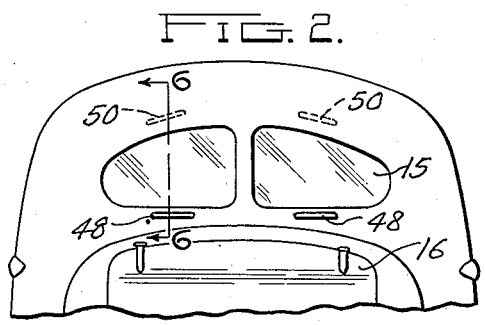
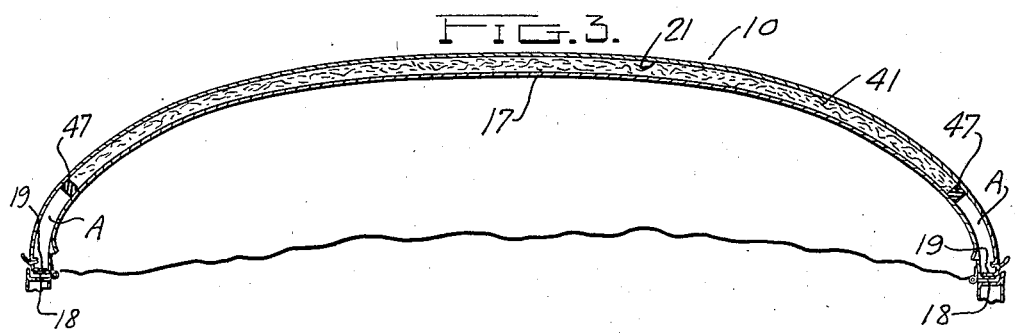
Inventor
Claud E. Shumaker
By
Attorney Feb. 4, 1941.  C. E. SHUMAKER  2,230,439
AUTOMOBILE BODY STRUCTURE
Filed March 10, 1939    2 Sheets-Sheet 2
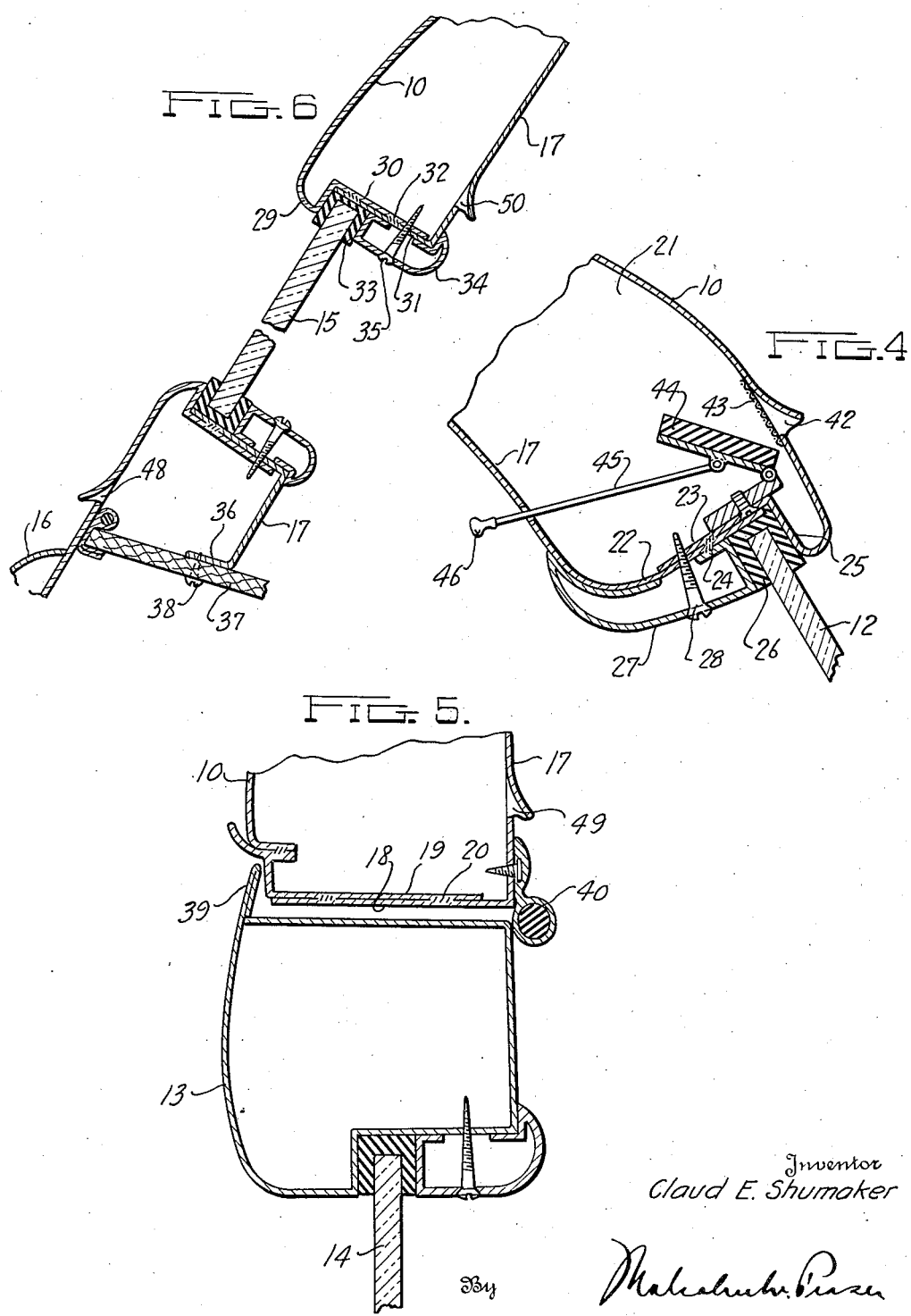
Inventor
Claud E. Shumaker
By
Attorney Patented Feb. 4, 1941

2,230,439

UNITED STATES PATENT OFFICE 2,230,439

AUTOMOBILE BODY STRUCTURE

Claud E. Shumaker, Detroit, Mich.

Application March 10, 1939, Serial No. 261,014

2 Claims. (Cl. 296—137)

This invention relates to automobiles but more particularly to the construction and ventilation of automobile bodies.

Objects of the invention are to produce a new and improved top construction for an automobile body by which the top is efficiently braced and provision is made for decorating the interior of the top without the use of the usual textile fabrics; to produce a sub-panel construction for the top of an automobile body which serves as a satisfactory brace; to produce a simple and efficient sub-roof panel having the new and improved features of construction and advantages hereinafter described; to produce a new and improved system of ventilation for automobile bodies by which a system of channels may be conveniently formed in the body top through which air from the outside may be deflected in any desired manner for introducing fresh air to the interior of the body or exhausting foul air, gasses and smoke therefrom; and to produce an automobile body structure having the novel features of construction and arrangement hereinafter defined.

For purposes of illustration but not of limitation, an embodiment of the invention is shown on the accompanying drawings in which Figure 1 is a front perspective view of the upper portion of an automobile body;

Figure 2 is a rear end elevation of a portion of an automobile body;

Figure 3 is an enlarged transverse sectional elevation substantially on the line 3—3 of Figure 1;

Figure 4 is an enlarged fragmentary sectional view substantially on the line 4—4 of Figure 1;

Figure 5 is an enlarged fragmentary vertical sectional elevation on the line 5—5 of Figure 1; and Figure 6 is an enlarged fragmentary sectional elevation on the line 6—6 of Figure 2.

The illustrated embodiment of the invention comprises an automobile body having a metal top 10, hood 11, front windshield 12, door 13 provided with the usual window glass 14, and rear windows 15 arranged in the usual manner above the trunk 16. It will be apparent that the top or roof panel 10 slopes downwardly at the front to the windshield 12 and at the rear end slopes downwardly to the rear windows 15.

In accordance with this invention, a sub-panel 17 of sheet metal is substantially uniformly spaced from the roof panel 10 and as shown in Figure 3, curves downwardly at opposite sides and is formed with an inturned flange 18 which overlaps an inturned flange 19 on the roof panel 10, these two flanges being suitably welded together as indicated at 20 on Figure 5. It will be observed from an inspection of Figure 3 that the panels 10 and 17 are substantially equi-distantly spaced throughout and form a chamber 21 therebetween. As indicated in Figure 4, the forward end of the sub-panel 17 has an upturned flange 22 with which a flange 23 on the roof panel 10 overlaps, welding 24 securing these parts together. The roof panel 10 is formed with a return bend 25 against which abuts a rubber panel strip 26 to receive the front windshield 12. Garnish molding 27 abuts against the opposite side of the rubber strip or retainer 26 and is held in place by screws 28.

The rear end structure is illustrated in Figure 6 in which the roof panel 10 has a return bend 29 from which extends a flange 30 which overlaps a flange 31 on the sub-panel 17, welding 32 securing these parts together. Abutting against the return bend 29 is a rubber strip or retainer 33 which embraces the rear window 15. Garnish molding 34 abuts against the opposite side of the retainer 33 and is held in place by screws 35. At the lower portion of the window the sub-panel 17 has at its free end a flange 36 to which a fibre panel 37 is secured by screws 38, such panel extending forwardly and providing a bottom of the usual package tray.

As illustrated in Figure 5, the door 13 has a flange 39 which overlaps the roof panel 10, the space between the door and the flange 18 being closed by the usual sealing strip 40.

One important advantage of the above construction resides in the provision of the sub-roof panel 17 which is of sheet metal and is so mounted as to brace effectively the top of the vehicle thereby eliminating the use of the usual form of bracing means. Heretofore, the top of the vehicle on the inside has been finished with textile fabric which is troublesome and expensive to install. By the use of the sub-panel 17, the necessity for such fabric lining is obviated because, if desired, the inside of the sub-panel 17 may be painted, grained or otherwise suitably decorated and since such decoration can be applied efficiently and inexpensively, the cost is materially reduced. Another advantage is that the metal surface can be readily cleaned and polished much more easily than it is possible to keep a fabric liner free from dust and dirt. If desired, flock may be adhered to the under surface of the sub-panel to provide a decorative effect.

The space 21 is admirably adapted for ventilation purposes and as shown in Figure 3, suitable insulating material 41 is disposed in this space. Any suitable or well-known type of insulating material may be used. For ventilation purposes, an inlet opening or louvre 42 is formed in the top panel 10 immediately above the windshield 12 and in rear thereof is disposed a screen 43. The opening 42 may be closed by a pivotal damper 44 actuated by a rod 45 having a knob 46 disposed on the inside of the body. The air stream entering through the louvre 42 may be deflected in any desired manner through the space 21 in order to deflect air inside the body or to aspirate or exhaust air from the inside of the body. In this instance, longitudinally extending strips of sponge rubber 47 are arranged adjacent opposite sides to provide air passages A which extend from front to rear of the body and connect with outlet louvres 48 disposed beneath the rear windows 15. In this instance, a louvre 49 is disposed above the door 13 and louvres 50 are disposed above the rear windows 15, these louvres being formed in the sub-panel 17. It will be obvious that any number of air panels may be formed in the space between the top panel 10 and sub-panel 17 so that the air may be directed to any desired location either to exhaust air from or deflect air inside of the body. The use of the sponge rubber strips 47 enables the air panels to be formed readily in any desired position and these may be adhesively connected to the panels to hold them in the desired position. It will thus be apparent that the number and arrangement of the air passages A may be varied as desired and also the number and arrangement of louvres opening inside of the vehicle may likewise be varied as desired. Accordingly, the arrangement shown and described is merely for purposes of illustration and should not be considered as limiting.

It is to be understood that numerous changes in details of construction, arrangement and operation may be effected without departing from the spirit of the invention especially as defined in the appended claims.

What I claim is:

1. In a closed automobile body, a sheet metal roof panel, a sheet metal sub-panel spaced therefrom substantially uniformly throughout its extent, an inturned flange formed along the longitudinal edge of said roof panel, a gutter strip having a lateral flange secured thereto and projecting beyond the outer surface of said roof panel, said gutter strip having a further inturned flange overlapping and secured to an outturned flange on the marginal edge of said sub-panel.

2. In a closed automobile body, a convexly curved sheet metal roof panel providing not only the roof for the body but also a portion of the side walls thereof, a similarly shaped sheet metal sub-panel spaced from said roof panel throughout the top and sides substantially uniformly, an inturned angular flange formed at the edge of the roof panel, an outturned flange formed at the edge of the sub-panel overlapping the roof panel flange and permanently secured thereto, the said roof panel further being formed at the window and windshield openings with return bent portions spaced from the panel body and terminating in abruptly bent inwardly extending flanges which overlap and are secured to flanges formed at the edge of said sub-panel around such openings, said return bent portions defining inwardly facing abutments against which the glass of the windshield and window is pressed, and moldings secured to the overlapping flanges of the roof and sub-panels for securing such glass in position.

CLAUD E. SHUMAKER.